(12) United States Patent
Engelien-Lopes

(10) Patent No.: US 9,107,069 B2
(45) Date of Patent: Aug. 11, 2015

(54) ADDRESSABLE RADIO DEVICE

(71) Applicant: Nordic Semiconductor ASA, Trondheim (NO)

(72) Inventor: David Alexandre Engelien-Lopes, Malvik (NO)

(73) Assignee: Nordic Semiconductor ASA, Trondheim (NO)

( * ) Notice: Subject to any disclaimer, the term of this patent is extended or adjusted under 35 U.S.C. 154(b) by 0 days.

(21) Appl. No.: 14/040,425

(22) Filed: Sep. 27, 2013

(65) Prior Publication Data

US 2014/0105396 A1    Apr. 17, 2014

Related U.S. Application Data

(60) Provisional application No. 61/712,596, filed on Oct. 11, 2012.

(51) Int. Cl.
*H04L 29/00* (2006.01)
*H04W 12/04* (2009.01)

(52) U.S. Cl.
CPC ................................... *H04W 12/04* (2013.01)

(58) Field of Classification Search
CPC ....................................................... H04W 12/04
USPC ........................................................... 380/270
See application file for complete search history.

(56) References Cited

U.S. PATENT DOCUMENTS

| | | | |
|---|---|---|---|
| 8,849,202 B2 * | 9/2014 | Linde et al. | 455/41.2 |
| 2006/0274643 A1 | 12/2006 | Choyi et al. | |
| 2010/0303236 A1 | 12/2010 | Laaksonen et al. | |
| 2012/0257753 A1 | 10/2012 | Ochikubo et al. | |
| 2013/0064372 A1 * | 3/2013 | Delport et al. | 380/270 |

* cited by examiner

*Primary Examiner* — Brandon Hoffman
*Assistant Examiner* — Michael D Anderson
(74) *Attorney, Agent, or Firm* — Beyer Law Group LLP (57) ABSTRACT

An addressable radio is described in which the radio has an address that includes (i) a value derived from a counter and (ii) a hash of a combination of the value and an identity-resolving key for the radio device.

22 Claims, 4 Drawing Sheets

ADDRESSABLE RADIO DEVICE

This application claims priority under 35 U.S.C. §119(e) to U.S. Provisional Patent Application No. 61/712,596, filed Oct. 11, 2012, entitled "ADDRESSABLE RADIO DEVICE", which is hereby incorporated by reference in its entirety.

This invention relates to addressable radio devices.

A number of short-range radio communication protocols are known in which a master device communicates with a peripheral or slave device, e.g. to control the peripheral device and/or to receive data from it or to send data to it. Such protocols include Bluetooth, Bluetooth Low Energy, ANT and Zigbee. Such a radio device is typically an addressable device; i.e. it has an associated device address and is configured to respond (e.g. by performing an action or by transmitting a return message) to radio messages addressed to that device address (e.g. radio messages which contain the device address as part of the message). It will typically ignore at least some radio messages addressed to other devices in a system.

A slave device might, for instance, be a wireless heart-rate monitor, which could be controlled by a user's mobile telephone, acting as a master device. The mobile telephone could collect heart-rate information from the monitor and display it for the user.

Such radio devices typically have associated device addresses which are included in transmitted data packets in order to determine the sender and/or intended recipient of the data. A device address may be included in every data frame, or only at the beginning of an exchange, e.g. in an advertising message (after which some form of session or channel identifier may be used instead).

The possibility therefore exists for a person to be identified and/or tracked by listening for a device address or addresses known to be associated with that person; for instance, the address of a heart-rate monitor or mobile telephone belonging to that person. This leads to privacy concerns.

Figure 1:
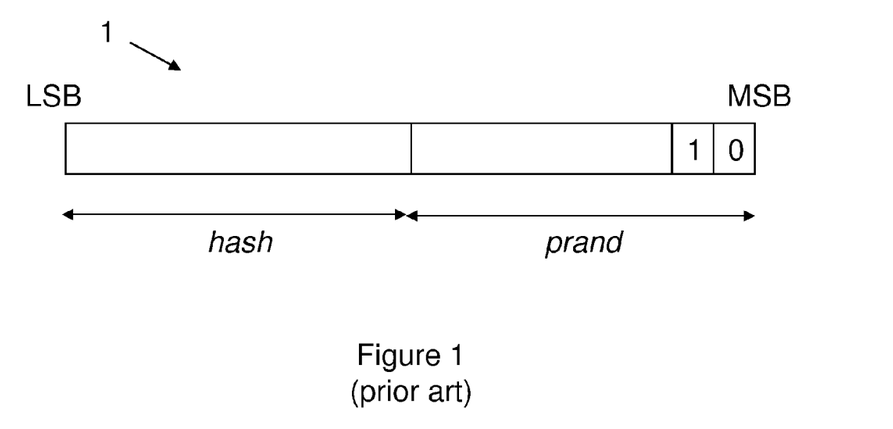
FIG. 1 is a figurative representation of a radio device address known from the prior art.

One approach to addressing such concerns is exemplified in the Bluetooth Low Energy specifications (e.g. Bluetooth Core Specification 4.0, published 30 Jun. 2010). This allows a device to use a "resolvable private address" instead of a static, public address. FIG. 1 shows the structure of such a resolvable private address 1. The address consists of a randomly generated 24-bit random number, prand, which is concatenated with a hash value, hash. The two most-significant bits of prand always equal '0' and '1' as shown; the remaining bits are random and must not all equal '0' nor all equal '1'. The value of hash is the 24 least-significant bits of the result of encrypting prand (zero-padded to 128 bits) using the Advanced Encryption Standard (AES) encryption algorithm with a device-specific 128-bit "Identity Resolving Key" (IRK).

The device can change its private address at regular intervals by generating a new value of prand and calculating a corresponding new hash value. To an outside observer, the private address appears to be random data (with the exception of the two most-significant bits), such that the device cannot be consistently identified or tracked after each new change of address. However, the private address can still be used to determine the identity of the device by any other device with which the first device has previously shared its Identity Resolving Key (IRK). On receiving a resolvable private address, the second device tries to decrypt the hash component using the IRK of each device known to it, in turn. If a particular IRK results in a decrypted value that matches the prand component of the address, this reveals the identity of the first device, because the address must belong to the device whose IRK was successfully used. If a slave device (e.g. a heart-rate monitor) advertises itself using a resolvable private address, an eavesdropper should be unable to identify or track the slave device (and the person carrying it) for any longer than the interval between address changes. Similarly, if a master device (e.g. a mobile telephone) uses a resolvable private address when scanning for or connecting with a slave device, an eavesdropper should be unable to identify or track the master device (and the person carrying it) for any longer than the interval between address changes.

However, the applicant has recognised that such an approach can still be vulnerable to privacy attacks if a third party actively masquerades as a known peer (i.e. as a white-listed device). The present invention thus seeks to provide a better approach.

From a first aspect, the invention provides an addressable radio device having an address that comprises (i) a value derived from a counter and (ii) a hash of a combination of said value and an identity-resolving key for the device.

Thus it will be seen by those skilled in the art that, in accordance with the invention, a device uses an address based on a counter, which allows a new device address to be generated by incrementing the counter. Significantly, this allows old addresses to be readily distinguished from current and future addresses. A second, peered device, on receiving an address of the first device, can check that the address is fresh by checking that the value in the address is derived from a higher value of the counter than was the case for an address used by the first device in an earlier communication with the second device. Such a check (or similar) can be used to reduce the opportunity for a privacy attack on the second device in which an attacker masquerades as the known, first device by transmitting a message containing a device address of the first device, acquired through prior eavesdropping of radio communications, with the aim of eliciting an identifiable response from the second device. If the second device determines that the device address presented by the attacker is an old address, it can decide not to respond, thereby thwarting any attempt at identification or tracking.

The invention can be viewed from various aspects.

From a second aspect, the invention provides a method of generating an address for an addressable radio device, the method comprising:
deriving a value from a counter; and
calculating an address comprising (i) said value and (ii) a hash of a combination of said value and an identity-resolving key for the device.

The method preferably further comprises incrementing the counter.

From a third aspect, the invention provides a method of operating an addressable radio device, the method comprising the device transmitting by radio an address that comprises (i) a value derived from a counter and (ii) a hash of a combination of said value and an identity-resolving key for the device. The address may be included in an advertising message.

From a fourth aspect, the invention provides a method of operating an addressable radio device, wherein the radio device has an address that comprises (i) a value derived from a counter and (ii) a hash of a combination of said value and an identity-resolving key for the device, the method comprising the device receiving and processing a radio transmission that includes the address of the radio device.

From a fifth aspect, the invention provides a method of operating a radio device, the method comprising the device receiving and processing a radio transmission, wherein the radio transmission includes an address of a second, sending radio device, and wherein the address comprises (i) a value derived from a counter and (ii) a hash of a combination of said value and an identity-resolving key for the sending device. The first radio device may be addressable; i.e. it may be associated with a first device address and may be configured to respond to a radio message addressed to that device address (e.g. containing the address). Said radio transmission may also include an address of the first, receiving radio device, although this is not essential (e.g. the transmission may instead be an undirected advertising event).

In some embodiments, the device address may be contained in an advertising protocol data unit (PDU), scanning PDU or initiating PDU, substantially as defined in the Bluetooth Low Energy specifications (except for using the novel address format).

The radio device preferably comprises means for calculating or generating the address, such as hardware logic and/or a microcontroller running software. The device is preferably configured to derive said value from the counter. The counter may be remote from the device, but the device preferably comprises the counter. For instance, the counter may be located in a common housing with radio transmitting and/or receiving means or logic of the device. The counter may comprise hardware and/or software configured to maintain and increment a count value. It may, for instance, comprise a number of flip-flops, or it may be implemented by firmware running on a microcontroller, e.g. as a variable stored in memory. The counter is preferably configured to store or maintain a current count value across multiple radio transmissions or sessions, which may include when other circuitry in the device is powered down or in a sleep state. The device may store a current count value in non-volatile memory, or it may be configured to maintain power to a counter memory while other circuitry in the device is powered down or asleep. A reset mechanism for the counter may be provided.

The counter may count in any appropriate way. In preferred embodiments, it is a counter that increments through successive integer values. The value derived from the counter may simply be the current value of the counter. However, it may be some function of the value of the counter, such as a multiple of the output of the counter. In one preferred set of embodiments, the value is the output of the counter, with two appended bits: a "1" in the next-to-most-significant bit position and a "0" in the most-significant bit position. The total length of the value may be 24 bits. Such a format can provide compatibility with existing Bluetooth Low Energy devices.

The device is preferably configured to increment the counter. It may be configured to do this at regular intervals, or when a particular condition is met. This is explained in more detail below. The counter is preferably initiated to a starting value (e.g. zero) when the device is commissioned. The device may be configured to reset the counter to a starting value when a reset condition is met.

The counter is preferably of sufficient capacity that, in normal usage, it will not roll over during the expected lifetime of the device. For instance, it may be a counter having at least 210 unique values, preferably at least 220 unique values. In a preferred set of embodiments, it is a 22-bit counter.

The hash may take any suitable form. The device is preferably configured to apply a hash algorithm to the value and the identity-resolving key. The hash algorithm preferably acts on the value and the identity-resolving key to generate an output in such a way that it is infeasible or impossible to determine the key from the output. The hash is preferably such that it is infeasible or impossible, for a given output, to determine a value and key that would cause the function to generate this output. The hash preferably uses the Advanced Encryption Standard (AES) algorithm; preferably using the identity-resolving key as the encryption key (preferably a 128-bit key); and preferably to encrypt the value derived from the counter (which may be padded to an appropriate length as necessary, e.g. with zero bits). The hash may be the truncated output of an encryption operations. Preferably, the hash is a function of the output of an AES operation, such as comprising the 24 least-significant bits of the output. This can reduce the size of the total address, leading to more efficient transmission. It can also provide compatibility with existing Bluetooth Low Energy devices. The hash is preferably calculated as the "Random Address Hash function ah" in a Bluetooth Core Specification (e.g. version 4.0), where r is the value derived from the counter.

The identity-resolving key may be a 128-bit number. It is preferably specific to the device. It may be stored in a memory of the device. Knowledge of the key by another device preferably allows that other device to determine the identity of the first device from the address. The nature and use of the identity-resolving key by devices embodying the present invention may be substantially as described for the identity-resolving keys in a Bluetooth Core Specification (e.g. version 4.0).

The device is preferably configured to generate the address from the value derived from a counter. The address is preferably the value concatenated with the hash. A least significant octet of the hash may become the least significant octet of the address, while a most significant octet of the value may become the most significant octet of the address. The device may comprise a memory and may store the address in the memory. The device may have multiple addresses, but in at least some embodiments the device has only the one address.

The device is preferably configured to operate substantially as a Bluetooth Low Energy device; i.e. as defined in a Bluetooth Core Specification (e.g. version 4.0).

The device may be configured to transmit a radio message containing, e.g. advertising, its address. Such a device may be configured to act as a slave device, e.g. substantially in accordance with a Bluetooth Low Energy slave role as defined in a Bluetooth Core Specification (e.g. version 4.0). The address may be encoded in any suitable way. The device may be configured to change its address at intervals by incrementing the counter; and preferably at regular intervals, e.g. about every 15 minutes.

The device may be configured to act as a master device, e.g. substantially in accordance with a Bluetooth Low Energy master role as defined in a Bluetooth Core Specification (e.g. version 4.0). It may be configured to transmit a scanning or connection radio message that includes its address. Such a device may be configured to change its address by incrementing the counter after completing a connection establishment with a slave device.

The device may also be configured to receive a radio message from a second device that includes an address of the second device, wherein the received address comprises (i) a value derived from a counter and (ii) a hash of a combination of said value and an identity-resolving key for the second device. The device may store one or more peer identity-resolving keys, associated with other radio devices. It may calculate a hash of the value in the received address using one of the peer identity-resolving keys, and may be configured to determine whether the calculated hash matches the hash in the received address. It may try each stored peer identity-resolving key until a match is found, thereby identifying the second device, or until all the keys have been tried without a match (if the device is unknown). The first device preferably stores a local count value associated with each peer device or identity-resolving key. After identifying the second device, the first device preferably uses the local count value to determine whether the value in the received address satisfies a predetermined freshness condition. The freshness condition may include that the received value is derived from a counter that is greater than the local count value. This can be used to ensure that an attacker is not mimicking the known device by replaying a captured address used previously by the device. The condition may also include that the received value is derived from a counter that is not more than a freshness threshold amount greater than the local count value. This freshness threshold can effectively set a limit on how long the second device can be out of communication with the first device and still satisfy the freshness condition. If the second device is a slave device that changes its address every 15 minutes, the freshness threshold may be around 35,000, which would correspond to about a year. It may, however, be much less than this, e.g. around 100 or 1,000, or it may be more, e.g. around 100,000 or more. Applying such a freshness threshold can limit the opportunity for an attacker to capture an address transmitted by the second device after its last communication with the first device and to use such an address to masquerade as the first device. If the freshness condition is not met, the device preferably rejects the radio transmission. If it is met, the local count value is preferably updated to correspond to the counter from which the value in the received address was derived, and further communication between the devices may proceed.

In some embodiment, the first device may increment a local count value at regular intervals, e.g. every 15 minutes; this may allow the local count value stored by a master device to remain approximately synchronised with a counter used by a second, slave device, which could further limit an attacker's opportunity to masquerade as the second device by allowing a smaller freshness threshold to be acceptable.

In some implementations, the counter and/or a local count value may be stored using finite precision, e.g. 22 bits. It may be subject to modulo-arithmetic roll-over. A first value being "greater" than a second value may be given any appropriate definition in such contexts; e.g. the first value may be understood as being greater than the second if it is ahead of the second value by up to half, or some other suitable fraction, of the modulus.

From a six aspect, the invention provides a radio device configured to:
  receive a radio transmission that includes an address of a sending radio device, wherein the address comprises (i) a value derived from a counter and (ii) a hash of a combination of said value and an identity-resolving key for the sending device;
  determine that the received hash is a combination of the received value and a stored identity-resolving key associated with the sending radio device; and
  determine that the received value satisfies a predetermined freshness condition.

Such a radio device may itself have an address that comprises (i) a value derived from a counter and (ii) a hash of a combination of said value and an identity-resolving key for the device, but this is not essential. It may implement any of the optional features described above concerning freshness conditions.

From a further aspect, the invention provides a communication system comprising a first radio device and a second radio device, wherein the first radio device is configured to:
  send a radio transmission that includes an address of the first radio device, wherein the address comprises (i) a value derived from a counter and (ii) a hash of a combination of said value and an identity-resolving key for the first device,
  and wherein the second radio device is configured to:
  receive said radio transmission;
  determine that the received hash is a combination of the received value and a stored identity-resolving key associated with the first radio device; and
  determine that the received value satisfies a predetermined freshness condition.

A radio device according to any of the foregoing aspects is preferably configured to send its identity-resolving key to another device and/or to receive an identity-resolving key from another radio device. Such a key transmission or exchange preferably occurs substantially as described in a Bluetooth Core Specification (e.g. version 4.0).

A radio device according to any of the foregoing aspects preferably comprises a radio transmitter and/or radio receiver. It preferably comprises processing means for carrying out steps described herein. Such processing means may comprise any one or more of: a CPU, a microcontroller, a microprocessor, an ASIC and an FPGA. The invention extends to software (e.g. firmware) comprising instructions which, when executed on a radio device comprising processing means, causes the processing means to carry out any of the methods described herein.

In one set of embodiments, the value derived from a counter in the device address may be, or may comprise, an encrypted value derived from a counter (e.g. an encrypted count value). It may be encrypted with a device-specific key, such as the identity-resolving key. The value may be encrypted using the Advanced Encryption Standard (AES) encryption algorithm (e.g. occupying 128 bits in the device address), or some other algorithm (e.g. an encryption algorithm that outputs a 24-bit encrypted value). A receiving radio device may use a corresponding decryption key to decrypt the received encrypted value. The use of such encryption may further reduce the potential for an attacker to track a device, by making the value part of the address appear random and unpredictable to anyone without possession of an appropriate key.

A similar effect may be achieved in other embodiments by the value derived from a counter being, or comprising, a hash of a value derived from a counter (e.g. a 24-bit hash of a count value). The hash is preferably calculated using a key such as the identity-resolving key, for instance using the same hash algorithm as previously described. Since a receiving device cannot necessarily reconstruct, from a received hash, the original value derived from the counter (because hash functions are typically one-way functions), the receiving device may be configured to generate a set of allowable hash values based on successive local count values, and check that the received hash matches one of the set of allowable hash values. The set may contain a freshness threshold number of different hash values, based on incremental local count values starting from a stored local count value as described previously.

In another set of embodiments, the value derived from a counter may be derived from a linear feedback shift register (LFSR) or other pseudo-random number generator, with each successive LFSR or pseudo-random output corresponding to a counter increment. Again, a receiving device may be configured to compare a received value against a sequence of locally-generated LFSR or pseudo-random values, which may be seeded from a local count associated with the sending device, and which may contain a freshness threshold number of member values.

Optional or preferred features of one aspect or embodiment described herein may, wherever appropriate, be applied to any other aspect or embodiment.

Certain preferred embodiments of the invention will now be described, by way of example only, with reference to the accompanying drawings, in which.

Figure 2:
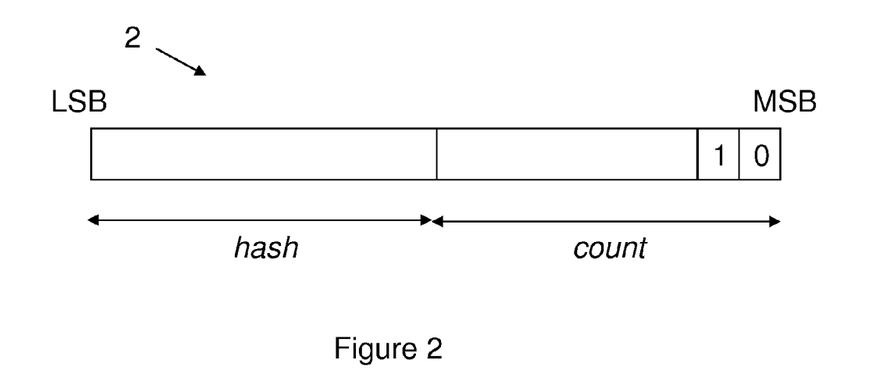
FIG. 2 is a figurative representation of a radio device address according to the invention.

FIG. 2 shows an address of a radio device embodying the invention. It has a 24-bit count portion, count, which consists of a numerical count value from a counter, concatenated with the bits "1" and "0". It also has a 24-bit hash portion, hash, which is the 24 least-significant bits of the result of encrypting count (zero-padded to 128 bits) using the Advanced Encryption Standard (AES) encryption algorithm with a device-specific 128-bit key (referred to as an identity-resolving key or IRK).

Figure 3:
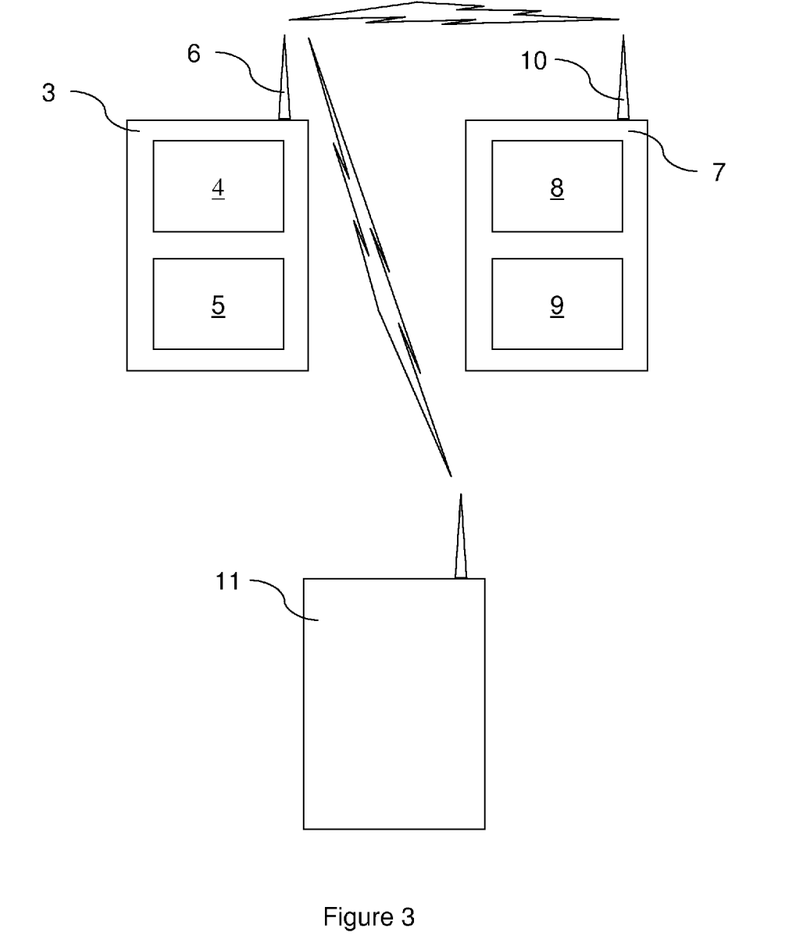
FIG. 3 is a schematic diagram of two radio devices embodying the invention and a malicious device.

FIG. 3 shows a first radio device 3, which may be a master Bluetooth Low Energy device, substantially as defined in the Bluetooth Core Specification 4.0. It has radio circuitry 4 and a microcontroller 5, as well as a radio antenna 6. Also shown is a second radio device 7, which may be a slave Bluetooth Low Energy device. It too has radio circuitry 8, a microcontroller 9 and an antenna 10. For the present purposes, the second device 7 is assumed to be peered (paired) with the first radio device 3. As a consequence of this peering, the first and second radio devices 3, 7 will have each other's identity-resolving key (IRK) accessibly to their respective microcontrollers 5, 9.

Finally, a third radio device 11 is also shown, which is assumed to be under the control of a malicious attacker. The attacker desires to determine when the first radio device 3 is in the vicinity of the third device 11, e.g. for the purposes of tracking the movements of the owner of the first radio device 3. If the first device 3 transmits messages containing its static device address, this is straightforward. The Bluetooth Core Specification 4.0 provides a mechanism of resolvable private addresses (RPA) to thwart this. However, an attacker can circumvent this by eavesdropping on communication by the second radio device 7, such as an advertising message; noting the device address of the second device 7 contained in the message; and subsequently transmitting its own advertising messages containing this address (i.e. impersonating the second radio 7), so as to elicit a response from the first device 3. If it receives such a response from the first device 3, it can use this to determine that the first device 3 is in the vicinity of the third device 11.

However, by having the first and second radio devices 3, 7 embody the present invention, such an attack can be detected by the first device 3 with high probability. This is because the second radio device 7 uses an address such as that shown in FIG. 2, and updates the count value at regular intervals. The attacker can only cause the third device 11 to replay an address that it has heard from the second device 7; it cannot generate future addresses because it does not know the IRK for calculating the hash portion of the address. The first device 3 can identify if it receives an expired address in an advertising message from the third device 11 and choose not to respond, thereby thwarting the attack.

Figure 4:
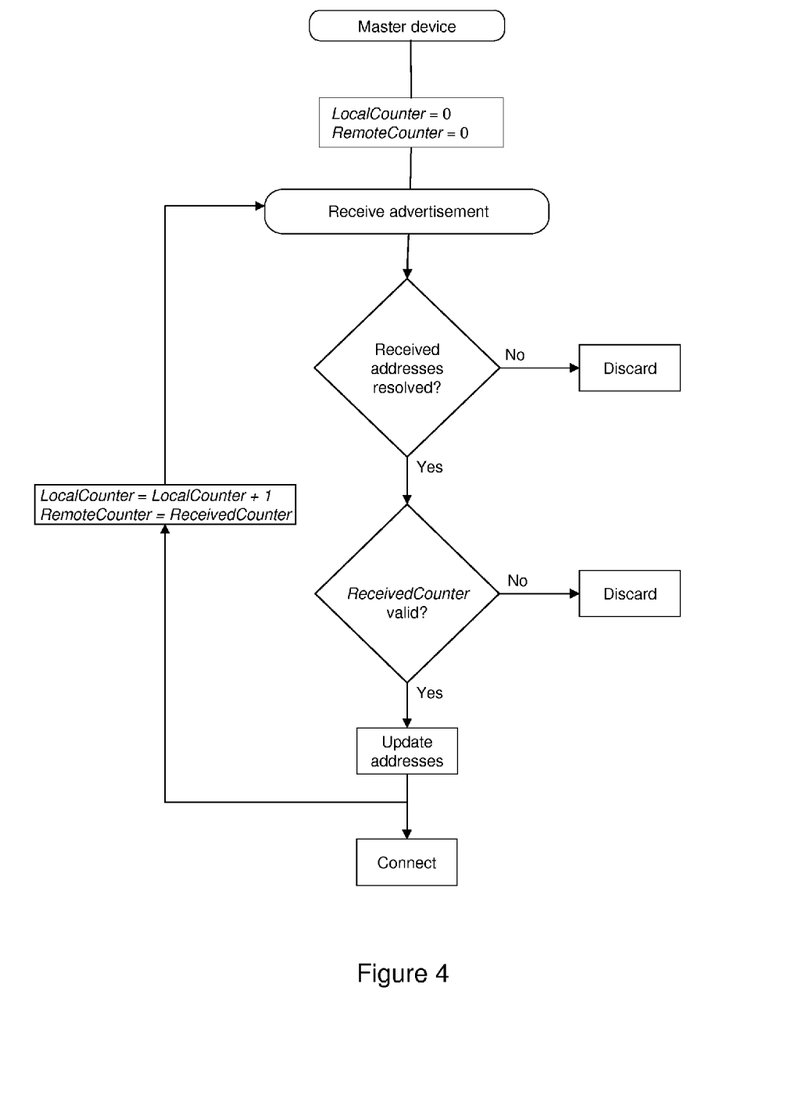
FIG. 4 is a flow diagram of steps carried out by a master radio device embodying the invention.

FIG. 4 shows steps taken by a radio device embodying the invention and acting in a master role, in respect of a peered slave device, substantially as defined in the Bluetooth Core Specification 4.0. The master device knows the IRK of the slave device from a pairing operation (not shown), and maintains a local variable RemoteCounter for the slave device which it updates with the latest-resolved address of the slave device after successful receipt and validation of an advertising message from that slave device. It also stores a 22-bit variable LocalCounter which it uses to generate its own master-device address having the format shown in FIG. 2. The value count in the master-device address is given by the current value of LocalCounter concatenated with a "1" bit and "0" bit as shown in FIG. 2. These variables are initiated to zero when first created.

When the master device receives a directed or undirected advertisement message which includes a resolvable private address of a slave device according to an embodiment of the invention (e.g. in an AdvA field), it first tries to identify the slave device. It does this by applying each slave IRK known to master device to the count value of the received slave address it in turn, using the AES-based hash algorithm described above, until it finds one that generates an output that is identical to the hash value in the received address. If none is found, the advertisement is discarded. If a matching IRK is found, the device then checks whether the received count satisfies validity criteria. If not, the advertisement is discarded. A value ReceivedCounter is extracted from count by stripping the two most-significant bits. The validity criteria are that ReceivedCounter is greater than RemoteCounter, and that ReceivedCounter minus RemoteCounter is less than a freshness threshold, CountPrivacy. In some embodiments, CountPrivacy may be set equal to 35,000, which corresponds to approximate a year of regular slave counter increments. Other values may, of course, be used. The arithmetic is carried out using always-positive values, modulo 2$^{22}$. The 22-bit counter will roll over approximately every 120 years with 15-minute slave-counter increments.

If the checks are passed, the master device stores the received slave address (or updates a previously-stored version) for use in any response message. It also updates its own address using the current value of LocalCounter. It then increments the value of LocalCounter and sets RemoteCounter equal to ReceivedCounter. It also continues with any required response to the slave device, such as establishing a connection with it.

As an example of possible behaviour when a 22-bit counter is near to rolling over (which is unlikely to happen in any real-world implementation), assume a master device receives an advertisement packet with a resolvable private address (RPA) having a ReceivedCounter value of 1,000, and has set the CountPrivacy to 10,000. Assume the master device's RemoteCounter is currently set to 4,194,000, Then the ReceivedCounter value minus RemoteCounter value, modulo 2$^{22}$ (4,194,304), is 1,304, which is less than CountPrivacy. A connect request packet may thus be sent and connection establishment initiated. The RemoteCounter is then set to the ReceivedCounter value. However, if CountPrivacy had instead been set to 1,000, then the ReceivedCounter value minus RemoteCounter value, modulo 4,194,304, would have been greater than CountPrivacy, in which case a connect request packet should not be sent.

If a software application running on the radio device sets CountPrivacy too low, this may create usability issues since low values, when exceeded, will force a re-bond to occur to reset the counter values. However if CountPrivacy is set too high then the protection against active privacy attacks is reduced because the second device may not know that it is being tracked (by being tricked into responding to an attacker masquerading as the known, peered device) for some considerable time.

Figure 5:
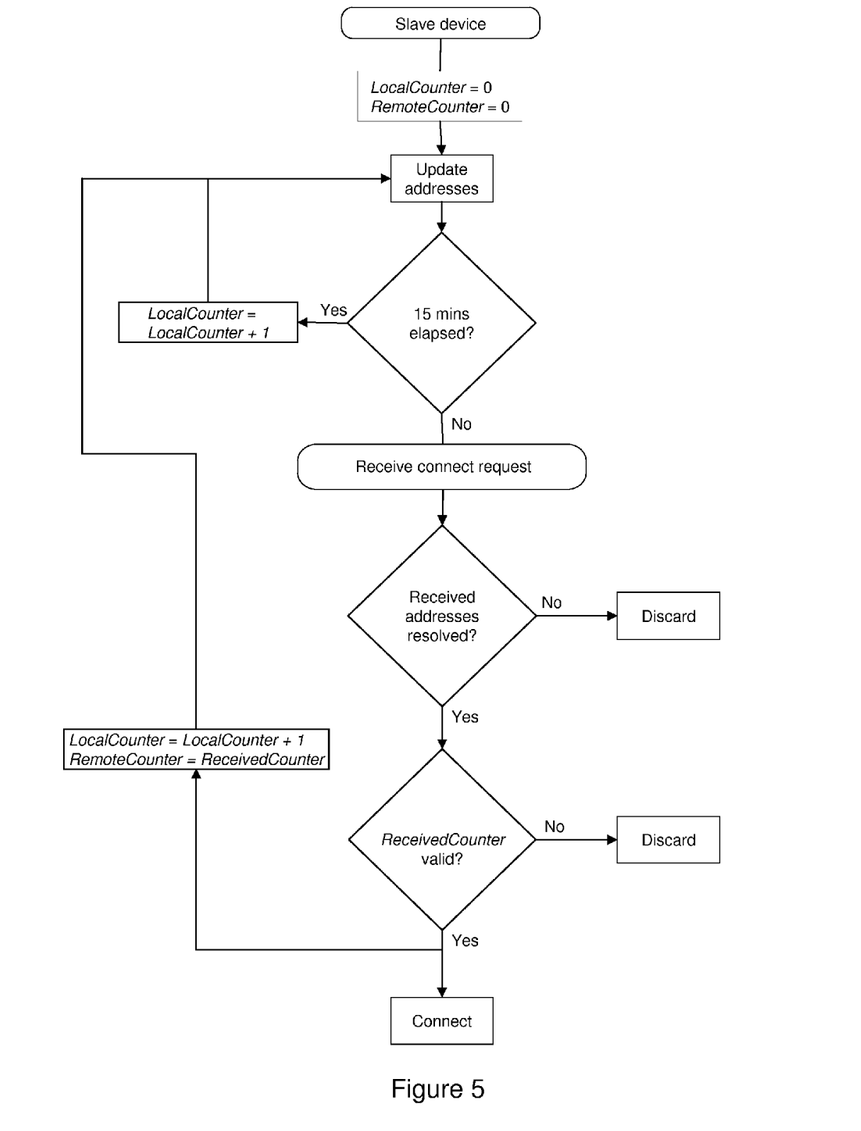
FIG. 5 is a flow diagram of steps carried out by a slave radio device embodying the invention.

FIG. 5 shows steps taken by a radio device embodying the invention and acting in a slave role, in respect of a peered master device, substantially as defined in the Bluetooth Core Specification 4.0. The slave device knows the IRK of the master device from a pairing operation (not shown), and maintains a local variable RemoteCounter for the master device which it updates with the latest-resolved address of the master device after successful receipt and validation of a connection message from the master device (e.g. taken from an InitA field). It also stores a 22-bit variable LocalCounter which it uses to generate its own slave-device address having the format shown in FIG. 2. The value count in the slave-device address is given by the current value of LocalCounter concatenated with a "1" bit and "0" bit as shown in FIG. 2. These variables are initiated to zero when first created.

After initialisation, the slave device sets its own address using the current value of LocalCounter. It also generates and stores the master device address using the master-device IRK (known to the slave from the pairing operation) based on the current value of RemoteCounter.

Whenever the slave device is not responding to a connection request, it increments LocalCounter every 15 minutes. Of course, other increment intervals are also possible.

When the slave device receives a connection message which includes a resolvable private address of a master device according to an embodiment of the invention, it first verifies the identity of the master device. It does this by applying the master IRK to the count value of the received master address, using the AES-based hash algorithm described above, and checking that the output is identical to the hash value in the received address. If it does not match, the connection message is discarded. If it matches, the slave device then checks whether the received count satisfies validity criteria. If not, the connection message is discarded. A value ReceivedCounter is extracted from count by stripping the two most-significant bits. The validity criteria are that ReceivedCounter is greater than RemoteCounter, and that ReceivedCounter minus RemoteCounter is less than a freshness threshold. In some embodiments, this threshold is 1,000, which is expected to give reasonable protection from attackers while maintaining acceptable usability. Other values may, of course, be used. The arithmetic is carried out using always-positive values, modulo 222.

If the checks are passed, the slave device increments the value of LocalCounter and sets RemoteCounter equal to ReceivedCounter. It updates the stored master address and its own address using the new values. It also continues with any required response to the master device, such as establishing a connection with it.

In this way, both a master device 3 and a slave device 7 can reduce the potential for an attacker to identify and track them. For a master device 3 to be maximally protected, it should require that all the slave devices it is peered with use counter-based addresses according to the present invention. However, some protection may be obtained even if this is not the case, since some slave devices may only communicate with the master device relatively infrequently, or out of range of an attacker.

The invention claimed is:

1. A method of operating a radio device, the method comprising the radio device:
receiving and processing a radio transmission, wherein the radio transmission includes an address of a second, sending radio device, and wherein the address comprises (i) a value derived from a counter and (ii) a hash of a combination of said value and an identity-resolving key for the sending radio device,
determining that the received hash is a combination of the received value and a stored identity-resolving key associated with the sending radio device; and
determining that the received value satisfies a predetermined freshness condition, wherein the freshness condition includes that the received value is derived from a counter that is greater than a stored local count value associated with the sending radio device.

2. A method of operating a radio device, the method comprising the radio device:
receiving and processing a radio transmission, wherein the radio transmission includes an address of a second, sending radio device, and wherein the address comprises (i) a value derived from a counter and (ii) a hash of a combination of said value and an identity-resolving key for the sending radio device,
determining that the received hash is a combination of the received value and a stored identity-resolving key associated with the sending radio device; and
determining that the received value satisfies a predetermined freshness condition, wherein the freshness condition includes that the received value is derived from a counter that is not more than a freshness threshold amount greater than a local count value associated with the sending radio device.

3. The method of claim 2, further comprising, after determining that the received value satisfies the predetermined freshness condition, updating the stored local count value to correspond to the counter from which the value in the received address was derived.

4. A radio device configured to:
receive a radio transmission that includes an address of a sending radio device, wherein the address comprises (i) a value derived from a counter and (ii) a hash of a combination of said value and an identity-resolving key for the sending device;
determine that the received hash is a combination of the received value and a stored identity-resolving key associated with the sending radio device; and
determine that the received value satisfies a predetermined freshness condition, wherein the freshness condition includes that the received value is derived from a counter that is greater than a stored local count value associated with the sending radio device.

5. The radio device of claim 4, configured, after determining that the received value satisfies the predetermined freshness condition, to update the stored local count value to correspond to the counter from which the value in the received address was derived.

6. The radio device of claim 4, configured to reject a received radio transmission if the radio transmission includes an address of a sending radio device, wherein the address comprises (i) a value derived from a counter and (ii) a hash of a combination of said value and an identity-resolving key for the sending device, and if the received value does not satisfy said predetermined freshness condition.

7. The radio device of claim 4, wherein said value derived from a counter is 24 bits in length and wherein said hash is 24 bits in length.

8. The radio device of claim 4, wherein the hash is a function of the output of an Advanced Encryption Standard (AES) encryption of the value derived from the counter, with the identity-resolving key as an encryption key.

9. The radio device of claim 4, wherein the value derived from a counter is the value of a counter that increments through successive integer values.

10. The radio device of claim 4, wherein the address is a concatenation of (i) the value derived from a counter and (ii) the hash.

11. The radio device of claim 4, wherein the stored identity-resolving key is a 128-bit number.

12. The radio device of claim 4, configured to operate substantially as a Bluetooth Low Energy device.

13. A radio device configured to:
receive a radio transmission that includes an address of a sending radio device, wherein the address comprises (i) a value derived from a counter and (ii) a hash of a combination of said value and an identity-resolving key for the sending device;
determine that the received hash is a combination of the received value and a stored identity-resolving key associated with the sending radio device; and
determine that the received value satisfies a predetermined freshness condition, wherein the freshness condition includes that the received value is derived from a counter that is not more than a freshness threshold amount greater than a local count value associated with the sending radio device.

14. The radio device of claim 13, configured, after determining that the received value satisfies the predetermined freshness condition, to update the stored local count value to correspond to the counter from which the value in the received address was derived.

15. The radio device of claim 13, configured to reject a received radio transmission if the radio transmission includes an address of a sending radio device, wherein the address comprises (i) a value derived from a counter and (ii) a hash of a combination of said value and an identity-resolving key for the sending device, and if the received value does not satisfy said predetermined freshness condition.

16. The radio device of claim 13, wherein said value derived from a counter is 24 bits in length and wherein said hash is 24 bits in length.

17. The radio device of claim 13, wherein the hash is a function of the output of an Advanced Encryption Standard (AES) encryption of the value derived from the counter, with the identity-resolving key as an encryption key.

18. The radio device of claim 13, wherein the value derived from a counter is the value of a counter that increments through successive integer values.

19. The radio device of claim 13, wherein the address is a concatenation of (i) the value derived from a counter and (ii) the hash.

20. The radio device of claim 13, wherein the stored identity-resolving key is a 128-bit number.

21. The radio device of claim 13, configured to operate substantially as a Bluetooth Low Energy device.

22. The method of claim 1, further comprising, after determining that the received value satisfies the predetermined freshness condition, updating the stored local count value to correspond to the counter from which the value in the received address was derived.

* * * * *